Patented May 16, 1933

1,909,691

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFFS

No Drawing. Application filed December 21, 1929, Serial No. 415,781, and in Germany April 8, 1927.

This invention relates to the production of new vat dyestuffs.

We have found that new valuable vat dyestuffs are obtained by condensing dibenzanthrones containing at least one nitrogen atom with a reactive hydrogen atom attached thereto with such amounts of polynuclear heterocyclic compounds containing at least two negative substituents as to produce compounds still containing at least one negative substituent in the molecule. The negative substituents may be for example halogen atoms or nitro groups. Examples of such heterocyclic compounds are for example negatively substituted naphthazines, anthraquinoneazines, pyrazolanthrones, polynuclear pyrimidines, benzanthronepyrazolanthrones, dipyrazolanthronyls, carbazols, acridones such as diphthaloylacridones or anthraquinoneacridones, flavanthrones, indigos, thioindigos and also the pyridino derivatives of anthanthrones, of ms-benzdianthrones, of benzanthrones and of other high molecular compounds. As regards the dibenzanthrone component preferably aminodibenzanthrone or derivatives or homologues thereof, in which one hydrogen atom of the amino group may be substituted by a low alkyl radicle, such as the methyl, ethyl or propyl group, are employed for the condensation. The said dyestuffs probably correspond to the general formula

where R stands for a dibenzanthrone radicle, R₁ stands for a polynuclear heterocyclic radicle, which contains at least one negative substituent and which may be substituted for example by further radicles of the type

and X stands for hydrogen or a lower alkyl radicle, such as the methyl, ethyl or propyl group.

The condensation is preferably carried out in solvents or diluting media of high boiling point, such as nitrobenzene or naphthalene or quinoline and acid fixing agents, for example alkali metal salts of weak acids such as sodium acetate, and catalysts such as copper and its compounds are preferably added. Excellent yields of the new dyestuffs are obtained.

The reaction products dissolve in concentrated sulphuric acid usually to violet solutions. From the vat they dye cotton depending on the amount of dyestuff used from dark blue, greenish blue or grey to black shades of excellent fastness.

If desired, the negative substituents still present in the molecules of the resulting dyestuffs may be replaced by other substituents by known methods.

In the above described condensation process nitro compounds of dibenzanthrones may be used at the nitrogenous component if a reducing agent such as hydrazine hydrate or sulphur or hydrogen sulphide and the like be added to the reaction mixture.

The following examples will further illustrate the nature of this invention but the invention is not restricted thereto. The parts are by weight.

Example 1

3 parts of hexa-chlor-8.8'-dihydroxy-1.2.1'.2'-naphthazine are boiled in 250 parts of nitrobenzene with 3 parts of sodium acetate, 1 part of copper oxide and 9.4 parts of aminodibenzanthrone while stirring, until all aminodibenzanthrone has entered into reaction. The resulting dyestuff can be separated by filtration by suction or by distilling off the suspension agent, if desired with the aid of reduced pressure or of water vapour or of both. The dyestuff is a black powder dissolving in concentrated sulphuric acid with a violet colouration and dyes the vegetable fibre greenish grey shades of very good fastness from a blue vat. The dyestuff still contains chlorine.

Example 2

42 parts of trichloranthraquinone-2.1-benzacridone, obtainable by chlorinating anthraquinone-2.1-benzacridone with the aid of sulphuryl chloride in nitrobenzene in the presence of iodine, are boiled in 1000 parts of nitrobenzene with 50 parts of sodium acetate, 10 parts of copper oxide and 94 parts of aminodibenzanthrone while stirring, until all aminodibenzanthrone has entered into reaction. The mass is worked up as described in Example 1. The resulting dyestuff which probably corresponds to the formula

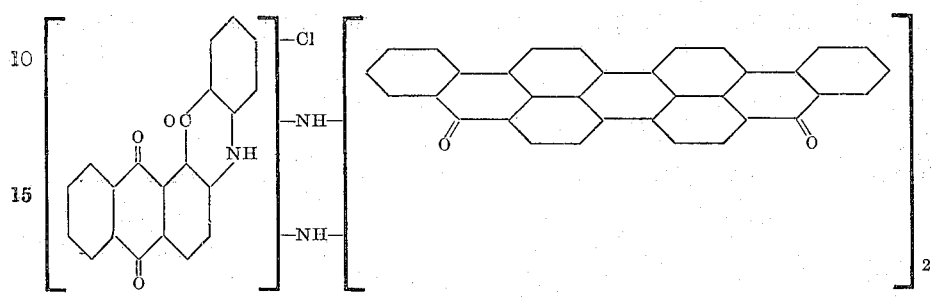

is a black powder which dissolves in concentrated sulphuric acid with a violet colouration and dyes the vegetable fibre from a grey vat grey to black shades of excellent fastness.

*Example 3*

6 parts of dibromdiphthaloylacridone are boiled in 250 parts of nitrobenzene after addition of 5 parts of sodium acetate, 2 parts of copper acetate and 4.7 parts of aminodibenzanthrone while stirring, until all aminodibenzanthrone has entered into reaction. The product is worked up in the usual manner, whereby the dyestuff is obtained in the form of a black powder dissolving in concentrated sulphuric acid with a reddish violet colouration and dyeing the vegetable fibre grey shades of excellent fastness from a blue vat.

*Example 4*

6 parts of dibrom-N.N'-dimethyl-2.2'-dipyrazolanthronyl, obtainable by brominating N.N'-dimethyl-dipyrazolanthronyl in chlorosulphonic acid, are boiled in 250 parts of nitrobenzene with 5 parts of sodium acetate, 1 part of copper oxide and 4.7 parts of aminodibenzanthrone while stirring, until unaltered aminodibenzanthrone is no longer present. The reaction mass is worked up in the usual manner. The resulting dyestuff which probably corresponds to the formula

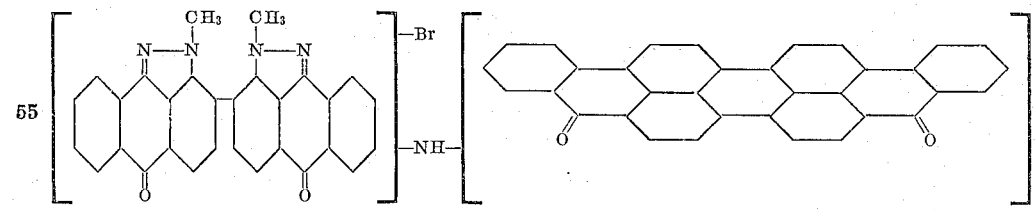

dissolves in concentrated sulphuric acid with a brownish violet colouration and dyes cotton claret shades from a blue vat.

*Example 5*

6 parts of dibrom-benzanthrone-pyrazolanthrone, obtainable by brominating benzanthrone-pyrazolanthrone in 6 per cent fuming sulphuric acid, are boiled in 250 parts of nitrobenzene with 5 parts of sodium acetate, 1 part of copper oxide and 4.7 parts of aminodibenzanthrone while stirring, until all aminodibenzanthrone has entered into reaction. The mass is worked up as usual. The resulting dyestuff dissolves in concentrated sulphuric acid with a violet colouration and dyes the vegetable fibre bluish green shades of excellent fastness.

*Example 6*

4.2 parts of Bz-3.5-dichlor-4-nitroanthraquinone-2.1-benzacridone, obtainable by nitrating Bz-3.5-dichloranthraquinone-2.1-benzacridone in nitrobenzene with the aid of nitric acid, are boiled in 100 parts of nitrobenzene with 5 parts of sodium acetate, 1.2 parts of copper oxide and 4.7 parts of aminodibenzanthrone while stirring, until all aminodibenzanthrone has entered into reaction. The resulting dyestuff which is isolated in the usual manner, dissolves with a violet colouration in concentrated sulphuric acid and dyes cotton from a grey vat grey shades of excellent fastness.

*Example 7*

59 parts of dibrompyridino-pyranthrone, obtainable by brominating the pyridino-pyranthrone which can be obtained by treating monoaminopyranthrone with glycerine and sulphuric acid, are boiled in 200 parts of nitrobenzene after the addition of 5 parts of sodium acetate, 2 parts of copper oxide and 4.7 parts of aminodibenzanthrone while stirring, until all aminodibenzanthrone has entered into reaction. The product which is separated in the usual manner dissolves in concentrated sulphuric acid with a blue colouration and dyes cotton from a violet vat currant shades.

Example 8

4.1 parts of dibromanthrapyrimidone, obtainable by brominating anthrapyrimidone in nitrobenzene, are boiled in 100 parts of naphthalene with 5 parts of sodium acetate, 1.2 parts of copper oxide and 4.7 parts of aminodibenzanthrone while stirring, until unaltered aminodibenzanthrone can no longer be detected. The dyestuff which is separated in the usual manner, dissolves in concentrated sulphuric acid with a brownish violet colouration and dyes the vegetable fibre from a blue vat greenish grey shades.

Example 9

7.2 parts of dibromcarbazol, obtainable by brominating carbazol in nitrobenzene, are boiled in 250 parts of nitrobenezene with 9.4 parts of aminodibenzanthrone, 10 parts of sodium acetate and 2 parts of copper oxide while stirring, until all aminodibenzanthrone has entered into reaction. By working up in the usual manner the dyestuff which probably corresponds to the formula

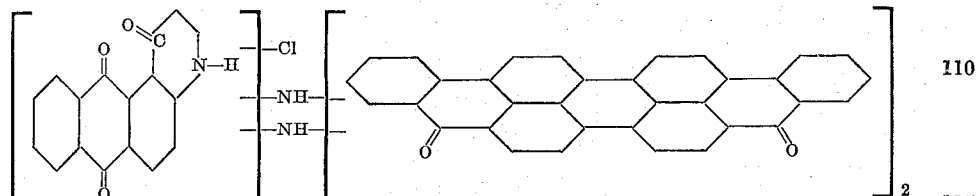

is obtained in the form of a black powder which dissolves in concentrated sulphuric acid with a reddish violet colouration and dyes the vegetable fibre greenish grey shades of excellent fastness from a blue vat.

Example 10

10 parts of the dibrom derivative, obtainable by bromination of the condensation product from 1 molecular proportion of dibromdibenzopyrenequinone with 2 molecular proportions of 1-aminoanthraquinone-2-aldehyde, are boiled in 250 parts of nitrobenzene with 15 parts of sodium acetate, 2 parts of copper oxide and 4.7 parts of aminodibenzanthrone while stirring, until unaltered aminodibenzanthrone can no longer be detected, whereupon the mass is worked up as usual. The dyestuff is obtained in the form of a dark violet brown powder dissolving in concentrated sulphuric acid with a bluish red colouration and dyeing cotton strong violet brown shades from a dark blue vat.

This application is a continuation in part of our copending application Ser. No. 267,478, filed April 4th, 1928.

What we claim is:

1. Vat dyestuffs giving grey to blue vats and violet solutions in concentrated sulphuric acid, the said dyestuffs probably corresponding to the general formula $$R-N-R_1$$
$$\overset{|}{X}$$

in which R stands for a dibenzanthrone radicle, $R_1$ stands for a polynuclear heterocyclic radicle, containing at least one substituent selected from the class consisting of halogen and the nitro group, and X stands for hydrogen or a low alkyl radicle.

2. Grey to green-blue to black vat dyestuffs giving grey to blue vats and violet solutions in concentrated sulphuric acid, the said dyestuffs probably corresponding to the general formula $$R-N-R_1$$
$$\overset{|}{X}$$

in which R stands for a dibenzanthrone radicle, $R_1$ stands for a polynuclear heterocyclic radicle, containing at least one substituent selected from the class consisting of halogen and the nitro group, and which is substituted by at least one further radicle of the type $$R-N-$$
$$\overset{|}{X}$$

and X stands for hydrogen or a low alkyl radicle.

3. The vat dyestuff probably corresponding to the formula:

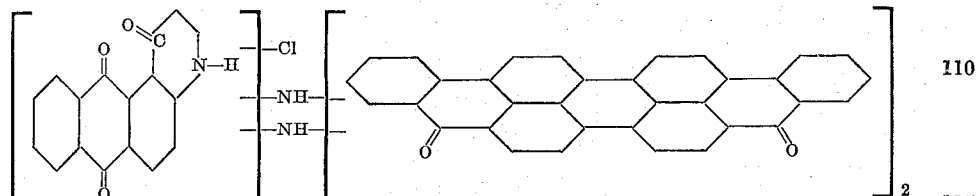

which dyestuff dyes the vegetable fibre from a grey vat grey to black shades and which dissolves in concentrated sulphuric acid with a violet coloration.

4. The process of producing vat dyestuffs which comprises condensing in the presence of a copper compound a dibenzanthrone containing at least one nitrogen atom having a reactive hydrogen atom attached thereto with such amounts of a polynuclear heterocyclic compound containing at least 2 substituents selected from the class consisting of halogen and the nitro group, as to produce compounds still containing at least one substituent of the said class in the molecule.

5. The process of producing vat dyestuffs which comprises condensing a dibenzanthrone containing at least one nitrogen atom having a reactive hydrogen atom attached thereto with such amounts of a polynuclear heterocyclic compound containing at least 2 substituents selected from the class consisting of halogen and the nitro group, as to produce compounds still containing at least one substituent of the said class in the molecule, in the presence of an inert organic diluent of high boiling point and of a copper compound.

6. The process of producing vat dyestuffs which comprises condensing a dibenzanthrone containing at least one nitrogen atom having a reactive hydrogen atom attached thereto with such amounts of a polynuclear heterocyclic compound containing at least 2 substituents selected from the class consisting of halogen and the nitro group, as to produce compounds still containing at least one substituent of the said class in the molecule, in the presence of an acid fixing agent and of a copper compound.

7. The process of producing vat dyestuffs which comprises condensing a dibenzanthrone containing at least one nitrogen atom having a reactive hydrogen atom attached thereto with such amounts of a polynuclear heterocyclic compound containing at least 2 substituents selected from the class consisting of halogen and the nitro group, as to produce compounds still containing at least one substituent of the said class in the molecule, in the presence of a copper compound, of an acid fixing agent and of an inert organic diluent of high boiling point.

8. The process of producing vat dyestuffs which comprises condensing a nitro dibenzanthrone in the presence of a reducing agent and of a copper compound with such amounts of a polynuclear heterocyclic compound containing at least 2 substituents selected from the class consisting of halogen and the nitro group, as to produce compounds still containing at least one substituent of the said class in the molecule.

In testimony whereof we have hereunto set our hands.

MAX ALBERT KUNZ.
KARL KOEBERLE.